United States Patent
Parker et al.

(10) Patent No.: US 12,192,081 B2
(45) Date of Patent: Jan. 7, 2025

(54) DE-CENTRALIZED HIGH RISK ACTIONS ON COORDINATED COMPUTER SYSTEMS

(71) Applicant: Salesforce, Inc., San Francisco, CA (US)

(72) Inventors: Andrew Parker, Indianapolis, IN (US); John Madden, Indianapolis, IN (US); Gabriele Roselli, Indianapolis, IN (US); Matthew Kramer, Fort Collins, CO (US); Raghavendra Gamoji, San Francisco, CA (US); Andrew Miller, Indianapolis, IN (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/162,604

(22) Filed: Jan. 31, 2023

(65) Prior Publication Data
US 2024/0259283 A1   Aug. 1, 2024

(51) Int. Cl.
*H04L 43/08* (2022.01)
*H04L 41/082* (2022.01)
*H04L 43/50* (2022.01)

(52) U.S. Cl.
CPC ............ *H04L 43/08* (2013.01); *H04L 41/082* (2013.01); *H04L 43/50* (2013.01)

(58) Field of Classification Search
CPC ..... H04L 43/0817; H04L 43/04; H04L 43/08; H04L 43/20; H04L 43/10; H04L 43/50; H04L 43/02; H04L 67/1097; H04L 67/10; H04L 67/1095; H04L 67/568; H04L 67/55; H04L 41/0893; H04L 41/08; H04L 41/082; H04L 69/40; H04L 43/082
See application file for complete search history.

(56) References Cited

U.S. PATENT DOCUMENTS

| | | | |
|---|---|---|---|
| 11,611,441 B2* | 3/2023 | Beecham | G06F 16/27 |
| 11,625,180 B1* | 4/2023 | Dinkar | G06F 3/0604 |
| | | | 711/154 |
| 11,669,368 B2* | 6/2023 | Doshi | G06F 8/443 |
| | | | 713/168 |
| 2016/0188427 A1* | 6/2016 | Chandrashekar | H04L 67/1097 |
| | | | 714/4.11 |
| 2017/0286518 A1* | 10/2017 | Horowitz | G06F 16/2365 |

(Continued)

FOREIGN PATENT DOCUMENTS

EP    3620905 B1 * 10/2022 ........... G06F 3/0605

OTHER PUBLICATIONS

"An Approach for the Automation of IaaS Cloud Upgrade", Mina Nabi Ericsson Inc., Ferhat Khendek Concordia University, Maria Toeroe Ericsson Inc., Mar. 23, 2021, publisher: arxiv:2103.12837, pp. 1-20 (Year: 2021).*

*Primary Examiner* — Rachel J Hackenberg
(74) *Attorney, Agent, or Firm* — Kwan & Olynick LLP (57) ABSTRACT

System and method for de-centralized handling of high risk actions across coordinated systems. A monitoring system is used as an action advisor for performing the high risk actions at nodes across coordinated systems. The monitoring system advises performing the actions based on one or more monitoring signals corresponding to the coordinated systems. The process for performing the high risk actions is de-centralized. A metadata substrate system acts as a message broker between the monitoring system and coordinated systems.

17 Claims, 6 Drawing Sheets

(56) References Cited

U.S. PATENT DOCUMENTS

| | | | |
|---|---|---|---|
| 2018/0107390 A1* | 4/2018 | Bae | G06F 9/5027 |
| 2019/0190888 A1 | 6/2019 | Madden et al. | |
| 2019/0347089 A1* | 11/2019 | Islam | G06F 11/1438 |
| 2021/0064420 A1* | 3/2021 | Goudarzi | G06F 9/5088 |
| 2023/0074799 A1 | 3/2023 | Madden | |

* cited by examiner

DE-CENTRALIZED HIGH RISK ACTIONS ON COORDINATED COMPUTER SYSTEMS

FIELD OF TECHNOLOGY

This patent document relates generally to computer systems, and more specifically to coordinated computer systems.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

Often times, with cloud computing, users interact and communicate with backend servers via a user interface that utilizes functions defined in an Application Programming Interface (API). Different coordinated systems use different APIs, and thus use different point solutions for executing high risk maintenance actions. However, each point solution is configured in an opinionated and specific manner. Consequently, in a network system implemented with a variety of different coordinated systems, current technology requires manually accessing each point solution when attempting to run maintenance actions across the entire network system. Accessing point solutions normally requires specific training, licensing overhead, knowledge of network protocol, and credentials, which makes coordinating maintenance actions across the entire network system costly, inefficient, error-prone, and ultimately unfeasible. Thus, there is a need for a generic and reliable solution that can push maintenance action across a variety of coordinated systems.

BRIEF DESCRIPTION OF THE DRAWINGS

The included drawings are for illustrative purposes and serve only to provide examples of possible structures and operations for the disclosed inventive systems, apparatus, methods and computer program products for managing decentralized high risk actions across different coordinated systems. These drawings in no way limit any changes in form and detail that may be made by one skilled in the art without departing from the spirit and scope of the disclosed implementations.

DETAILED DESCRIPTION

In the following description, numerous specific details are set forth in order to provide a thorough understanding of the present disclosure. The present disclosure may be practiced without some or all of these specific details. In other instances, well known process operations have not been described in detail to not unnecessarily obscure the present disclosure. While the disclosure will be described in conjunction with the specific embodiments, it will be understood that it is not intended to limit the disclosure to the embodiments.

As mentioned above, with coordinated systems, there is currently no way to push maintenance actions across multiple different coordinated systems without engaging each coordinated system's opinionated point solution. As used herein, a "coordinated system" refers to a subset of computers logically arranged with some degree of awareness of themselves and others in the set where coordination about state, such as quorum and leadership, which computer is up and which computer is not, and where data resides, can be agreed upon. For example, Oracle Enterprise Manager, a point solution for Oracle, can be used to manage Oracle products, but not MongoDB products. Thus, in the example, if the system needs to run a "reboot" command everywhere, the system would need to access both Oracle Enterprise Manger and the point solution for MongoDB.

In addition to a generic solution that can be used across all coordinated systems, another consideration is the implementation of a stage controlled solution with minimal interruption to users. Many high risk maintenance actions are highly disruptive to users because they often involve shutting down and rebooting servers. In many instances, this is highly disruptive of business because customers require high availability from databases. Thus, the techniques and mechanisms of the present disclosure also provide for a stage controlled solution where primary nodes may automatically defer the maintenance actions until all secondary nodes have been processed without the need to go through system specific point solutions.

For example, in a network system comprising 1000 machines, some machines could be databases. Within those databases, some machines may run MongoDB, some may run Oracle, some may run Cassandra, etc. In MongoDB specifically, there is a replica set of multiple nodes: one primary node that accepts both reads and writes, and secondary nodes that only accept reads. Actions that require shut down of a primary node, such as a transition between primary and secondary nodes, is considered a miniature outage-causing all clients to be disconnected temporarily and then reconnected to establish state. These actions, by definition, are disruptive, so a viable solution would minimize these disruptive actions. The techniques and mechanisms of the present disclosure allows the system to send a command, and also allows for certain nodes to defer the action because the nodes are primary, thereby letting non-primary nodes perform the action first. This stage controlled order occurs without using the centralized coordinator node of the system specific point solution, which has no idea why the action was deferred nor what is going to happen next. In other words, the techniques and mechanisms of the present disclosure provide for a hands off state machine following an order of operations that allows individual coordinated systems to make deferral decisions themselves without needing to install a system specific point solution.

Figure 1:
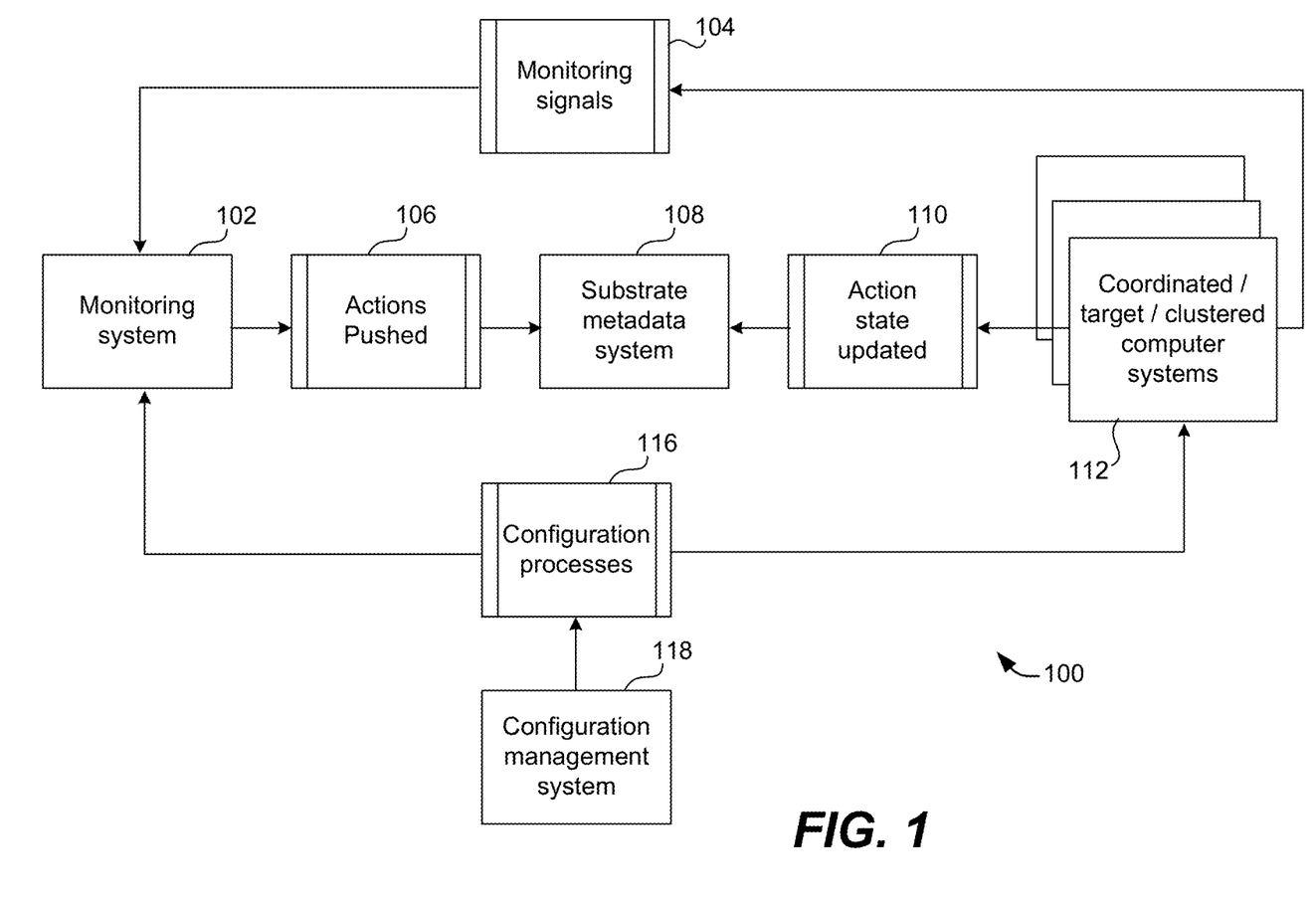
FIG. 1 is a block diagram showing example system components for handling high risk actions across coordinated systems, in accordance with one or more embodiments.

FIG. 1 is a block diagram showing example system components for handling high risk actions across coordinated systems, in accordance with one or more embodiments. More specifically, network system 100 includes monitoring system 102, substrate metadata system 108, coordinated systems 112, and configuration management system 118, all of which are course-grained components of network system 100.

According to various embodiments, monitoring system 102 operates as a coordinator that pushes actions into a queue. In some embodiments, monitoring system 102 tracks signals corresponding to various state information, e.g., a full disk, a system that is out of memory, or a system that is down. In some embodiments, monitoring system 102 uses these signals to know when it is safe to perform certain high risk operations, or when it is better to stop and wait. According to various embodiments, network system 100 tends to self-heal. In other words, if monitoring system 102 determines it is better to stop and wait, network system 100 will tend to heal itself and become safe enough to perform the high risk operations. In some embodiments, in rare occasions when network system 100 does not self-heal, active intervention is required to place network system 100 in a state safe enough to perform the high risk operations. According to various embodiments, monitoring system 102 is configured to use standard monitoring signals 104 to determine when it is safe to perform high risk maintenance actions across coordinated systems 112.

In some embodiments, monitoring system 102 is configured to group the multiple nodes in a coordinated system together into an "action group," and reason about the overall state of the action group and whether it is safe to perform some high risk operation on that action group, e.g., rebooting all the nodes in the action group. Many systems already utilize monitoring signals for specific purposes, e.g., CPU or memory usage. According to various embodiments, system 100 takes advantage of these monitoring signals 104 and groups a variety of these signals together to give a single determination on whether the system is healthy. In some embodiments, the "health" of a coordinated system 112 is needed in order to determine whether a high risk action can be safely performed. In some embodiments, the list of signals to determine "health" varies by the needs of the coordinated system in which any of needs being out of spec (above or below a defined threshold, for example) is enough of a signal to inform the high risk action coordinator to not proceed with that action group. In some embodiments, the monitoring system does not need to know this in a point-solution-specific manner because these items are all defined by the configuration management system such that the monitoring system only needs to establish a boolean "healthy or not." In some embodiments, the health of a system changes over time. This may be because performing a high risk action may cause the state of the system to fail. When that happens, in some embodiments, monitoring system 102 will wait for the system to recover before going to the next node.

In some embodiments, these monitoring signals 104 are continually scraped, or polled for changes to status and value, by monitoring system 102. Since monitoring signals 104 apply to nodes in various coordinated systems 112, monitoring system 102 can decentralize ascertaining the state nodes in different coordinated systems 112 without needing to use a centralized coordinator, e.g., coordinated system specific point solution. Thus, ascertaining the state of the nodes in each coordinated system 112 is uncoupled from its respective point solution. In some embodiments, the decentralized nature of system 100 allows for light authentication and loose coupling in a two-way messaging layer. In some embodiments, monitoring system 102 acts as an advisor or action management node-advising whether to perform certain actions 106 based upon monitoring signals 104. In some embodiments, monitoring system 102 utilizes many signals about the state of a coordinated system 112 as a whole, but lacks certain point-in-time intricacies of each system, which is only known within the system itself, for reasons of access, security, or case-specific intelligence. Thus, fully centralized direction of the system-pushing absolute instructions from a centralized mechanism end-to-end—is not ideal. Thus, in such embodiments, each coordinated system 112 maintains internal state invisible to the "centralized" monitoring system and must coordinate in the decision-making process to minimize impact to clients connected to it (hence, "de-centralized").

According to various embodiments, configuration management system 118 operates as a core of awareness of pushing out all the details of the topology in both directions, i.e., to monitoring system 102 and to coordinated systems 112. In other words, in some embodiments, configuration management system 118 coordinates between monitoring system 102 and coordinated systems 112. In some embodiments, this occurs within the nodes in a coordinated system 112 as well. For example, all nodes in a coordinated system running Cassandra may be aware of each other, and may be able to communicate with each other, because of system-specific elements of configuration enforced by configuration management system 118. This awareness contributes to the ability of the system to coordinate itself. More specifically, node-to-node awareness and communications allows for replication of data, leader election, and data locality intelligence. In some embodiments, configuration processes 116 allow automation of this process for various purposes, e.g., building a new database, which eliminates the need to configure all nodes manually, since manual configuration is error prone (i.e., subject to configuration drift). In such embodiments, configuration processes 116 ensure the reliability and consistency on coordinated nodes in a database.

According to various embodiments, configuration processes 116 are the outputs of configuration management system 118. In some embodiments, configuration management system 118 binds the other three systems together. In such embodiments, configuration management system 118 provides for the configuration and coordination of the coordinated computer systems 112, tells monitoring system 102 what to monitor and how to reason about grouping the different coordinated systems 112 together as a cohesive target for system actions 106, and defines the methods and access controls on substrate metadata system 108 used for communication. As mentioned above, configuration management system 118 operates as a core of awareness. In some embodiments, nodes are coordinated together. In such embodiments, the nodes themselves are aware of the coordination, and monitoring system 102 also needs to be aware of the coordination. According to various embodiments, configuration management system 118 facilitates coordination. For example, as mentioned above, in some embodiments, coordinated nodes are grouped into action groups. According to various embodiments, action groups are determined by some aspect of logical grouping, function, or geographic location combined with a system role, which determines what sort of coordinated system it contains. An example of this would be a group named "stack15:base: mongodb," where an action group comprises MongoDB nodes in Stack15 and also have the "base" system role. In some embodiments, system roles are an aspect of configuration management that determines what configuration aspects are installed and enforced on the nodes, what other nodes they can talk to, what signals should be monitored, etc. In the example, "Stack15" may refer to "the 15th logical grouping of computer assets containing myriad coordinated systems."

In some embodiments, action groups may include one or more "availability zones," or failure domains. According to various embodiments, configuration management system 118 uses configuration processes 116 to define units of coordination for monitoring system 102. In some embodiments, monitoring system 102 coordinates high risk actions on only one failure domain at a time within each action group. In addition, in some embodiments, monitoring system 102 only pushes actions 106 to one node in an action group at a time. In the example give above, "Stack15" might reside in a particular geographic location, e.g., Ohio, where the availability zones/failure domains are three data centers spread across the state for redundancy. In this example, when executing the high risk actions against this action group, the system may start with availability zone 1, or "az1," and process it to completion before starting "az2." In other words, in some embodiments, availability zones are processed in order, one after the other, to ensure only one failure domain is affected at a time. Otherwise, pushing actions on multiple nodes in the same action group at the same time may lead to failure of two nodes, which may shut down the database altogether. Thus, grouping nodes within an action group into coordination units defined by one fault domain at a time is essential for maintaining high availability of databases. In some embodiments, monitoring system 102 can also push actions 106 to multiple action groups in parallel. According to various embodiments, configuration management system 118 is a high availability coordinating component that provides intelligence to monitoring system 102 to reason about which coordinated nodes belong to which action group using topology/geography/failure domain grouping information.

In some embodiments, the coordinated systems 112 are not modified during, or as part of the execution of, the action. Instead, in such embodiments, monitoring system 102 pushes signals to the coordinated systems and the nodes independently know if they are ready to perform the actions. According to various embodiments, monitoring system 102 pushes actions 106 into substrate metadata system 108. As used herein, a substrate system is an underlying infrastructure, e.g., Amazon Web Service (AWS), on which a coordinated system, e.g., MongoDB, is run. In some embodiments, actions 106 include any high risk actions, such as maintenance actions, that system 100 needs to perform on its nodes. In some embodiments, the nodes of coordinated systems 112, a.k.a. "coordinated nodes," then look at substrate metadata 108 to detect actions pushed 106 in order to determine what to do next.

According to various embodiments, the nodes know what action, e.g., reboot, needs to be performed and then determines itself whether it is ready to perform the action. In some embodiments, this is hard-coded into the process by the configuration management system. In some embodiments, the decision, either an "initiate target action" (ready) or "wait to finish" (not ready), is also pushed into substrate metadata system 108. If the coordinated node is ready, the action will be performed and the coordinated node updates its status 110 to "pending." If not, the coordinated node will defer while other nodes are processed. According to various embodiments, deferral occurs when a node is primary and not ready to transition to a secondary. Eventually, the deferred node will be processed when all the other "ready" nodes are processed. In some embodiments, monitoring system is blind to what actually takes place inside coordinated system 112.

According to various embodiments, substrate metadata system 108 is a service that every node in the same substrate intrinsically has access to. In some embodiments, it provides metadata about the node, e.g., what data center the node belongs to, or what IP address the node has. According to various embodiments, substrate metadata system 108 acts as a message queue. Although substrate metadata system 108 is normally used to simply read about node state and node attributes, system 100 utilizes substrate metadata system 108 as a two-way message broker between monitoring system 102 and coordinated nodes. In some embodiments, in order to accomplish this, authentication credentials do not actually need to be distributed to both monitoring system 102 and nodes in coordinated system 112 because all credentials and access needed are intrinsic to the environment and substrate. In some embodiments, monitoring system 102 can write to substrate metadata system 108 and coordinated nodes can then read from it, as well as write responses back. According to various embodiments, communicating between monitoring system 102 and nodes in coordinated systems 112 in the substrate metadata layer allows monitoring system 102 to be agnostic towards the type of coordinated system. Because different coordinated systems 112 provide different functionalities to consumers, many network systems 100 utilize different coordinated systems based on need. All these different coordinated systems 112 behave differently, and have different requirements on how to perform high risk actions safely. Thus, by using a monitoring system 102 that is agnostic to the type of coordinated system 112, system 100 provides a generic solution for performing high risk actions safely across different coordinated systems 112. In some embodiments, substrate metadata system 106 allows simple communication between necessary components of the solution without adding additional communication channels and the necessary encryption and authorization controls necessary to use them. This avoids a scenario where a "centralized" monitoring system has too much access to the coordinated computer systems it is monitoring, thereby eliminating the risk associated with an external compromise of such a valuable component of the network.

According to various embodiments, messages are brokered through tagging. In some embodiments, substrate metadata system 108 includes tagging capabilities for identification of nodes and grouping of nodes for various purposes, such as identifying a node as belonging to a cost center. In some embodiments, these tag values can be arbitrary. In some embodiments, system 100 takes advantage of this by overloading the tagging feature to use the substrate metadata system 112 as a message broker. For example, monitoring system 102 will push a specific tag value, e.g., "high risk action status," to a certain tag by name, and the coordinated node will look for that tag to know its turn is up for processing.

According to various embodiments, coordinated nodes also push action state updates 110 to substrate metadata system 108. This is because, in some embodiments, monitoring system 102 needs to know whether or not the message was received, whether something has gone wrong or needs human intervention, or whether a node has been marked complete. In such embodiments, once a node has been marked complete, monitoring system 102 can go to the next node in that action group. In some embodiments, action state updates 110 are continuous status updates.

Figure 2:
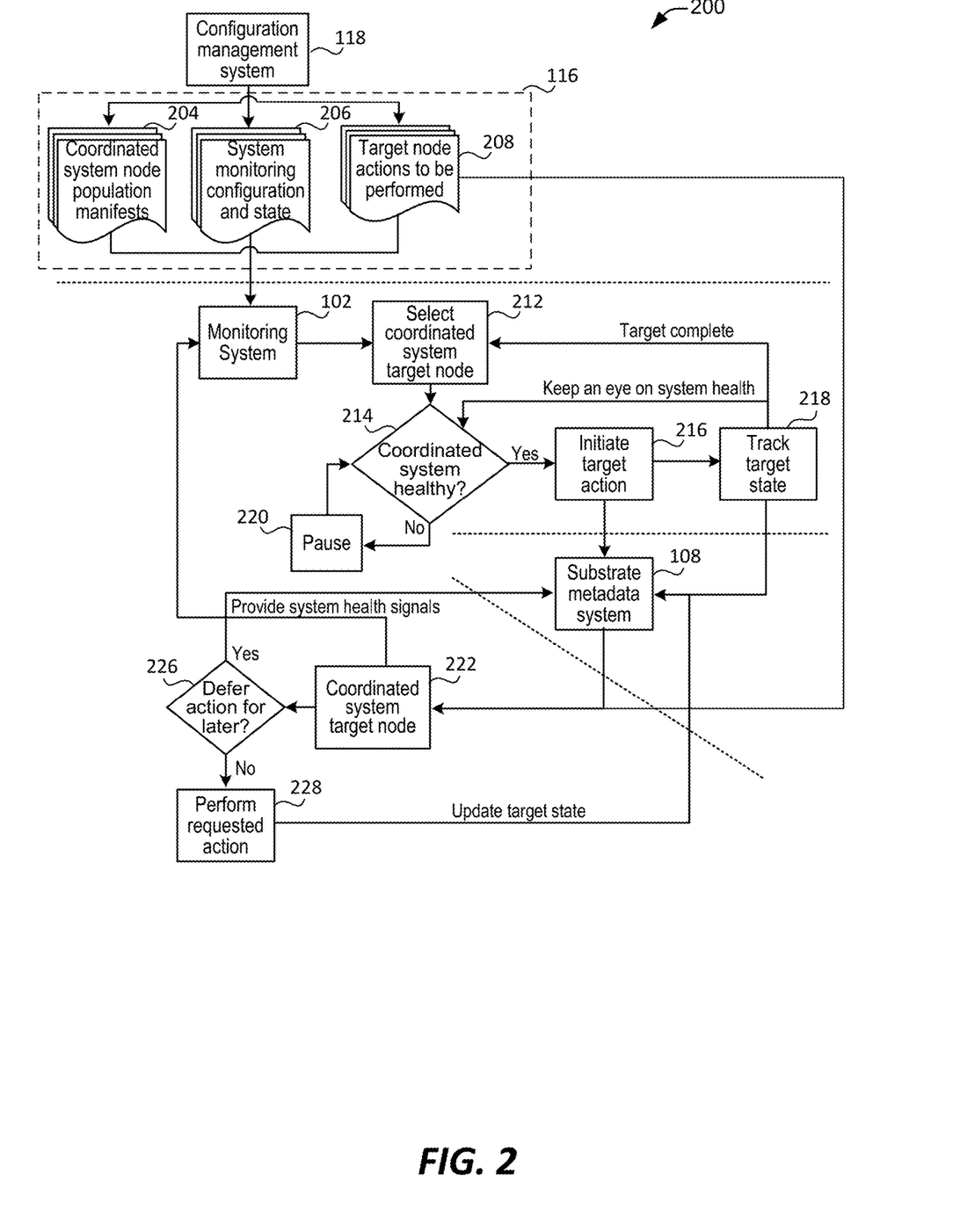
FIG. 2 illustrates a system flow diagram for handling de-centralized high risk actions across coordinated systems, in accordance with one or more embodiments.

FIG. 1 illustrates a general overview of the components of an example system for handling high risk actions across multiple coordinated systems in a decentralized manner. FIG. 2 illustrates a system flow diagram for handling decentralized high risk actions across coordinated systems, in accordance with one or more embodiments.

According to various embodiments, configuration management system 118 first derives and delivers all aspects of the topology to management system 102. As shown in FIG. 2, system flow 200 begins with configuration management system 118 inputting configuration processes 116 into monitoring system 102. In FIG. 2, configuration processes 116 comprise obtaining coordinated system node population manifests 204, system monitoring configuration and state 206, and target node actions to be performed 208. According to various embodiments, all these configuration processes are built into configuration management system 118 in an automated way.

In some embodiments, coordinated system node population manifests 204 include information such as how many nodes are in a coordinated system and where the nodes are located. In such embodiments, this information is then passed along to monitoring system 102 in order for monitoring system 102, with its own configuration code, to generate action groups.

In some embodiments, system monitoring configuration and state 206 includes information such as specific attributes of each coordinated node, of which monitoring system 102 needs to be aware and for which monitoring system 102 needs to be scanning. For example, system monitoring configuration and state 206 informs monitoring system 102 to check the CPU, check the disk, check the health of the coordinated system service, obtain metrics and graphs, generate alerts, etc.

In some embodiments, target node actions to be performed 208 include information such as a list of high risk actions to be executed on the coordinated systems. In some embodiments, the list of actions includes making sure the node is not a primary, and making sure the node is not out of memory. In some embodiments, after performing a high risk action such as a reboot, the list of actions specifies what a node should do in order to rejoin the coordinated system. In such embodiments, after performing the specified actions after a reboot, the node turns "green," or returns itself to normal health, and monitoring system 102 can then move on to the next node. In some embodiments, target node actions to be performed 208 also include how to perform the actions, and the code to execute an advisor role in the system. In some embodiments, target node actions to be performed 208 also go to the coordinated system itself, such as coordinated system target node 222.

According to various embodiments, having been provided by configuration management system 118 a list of coordinated systems, their members, and a set of actions and action schedules, monitoring system 102, knowing the health of the coordinated systems 112, initiates the work. In some embodiments, coordinated nodes, not knowing the overall health of their system, rely on monitoring system 102 to initiate actions. As shown in FIG. 2, after receiving the configuration processes 116, monitoring system 102 proceeds with selecting (212) a coordinated system target node using a predetermined algorithm. In some embodiments, after selecting the target node, monitoring system 102 first checks (214) the health of the coordinated system. If the system is not healthy, monitoring system 102 simply pauses (220) and waits until the system is healthy. If the system is healthy, then monitoring system 102 initiates (216) target action. In some embodiments, a node may have 100 different health signals, such as disk full, out of memory, etc. In such embodiments, monitoring system 102 does not allow for any deviation from signals that are good and healthy. In some embodiments, different thresholds are set for each signal to determine whether the node is healthy or not. In such embodiments, if any of those signals deviate, monitoring system pauses/stops (220) and waits for those signals to go "green." In some embodiments, if those signals never go green, human intervention is required to fix the problem.

In some embodiments, initiating (216) target action includes pushing a message specifying that it is the node's turn, into substrate metadata system 108. In some embodiments, monitoring system 102 then goes into a waiting pattern while tracking (218) the target node state. In some embodiments, when coordinated system target node 222 sees the message in substrate metadata system 108, target node 222 will then determine (226) whether to defer action for later.

In some embodiments, target node 222 can only defer if the node determines its work should be done later, or even last, to improve availability of the coordinated system for attached clients and users. In some embodiments, this determination can be due to the fact that the node is a primary node in a replication set, because if a primary node has to step down to become a secondary node, all the clients on all the nodes need to be disconnected. This causes errors and latency problems, which means switching from primary to secondary needs to be avoided if possible. In some embodiments, any primary nodes should perform the action last, in order to limit the number of transition events to a minimum.

In some embodiments, if target node 222 is a secondary node, then the action requested is performed (228). In some embodiments, this includes pushing an updated target state message back to substrate metadata system 108, indicating to monitoring system 102 that the action is in process. In such embodiments, monitoring system 102 will then see the updated target status message in substrate metadata system 108 and understand that target node 222 turned "pending" and is working. In some embodiments, the node then performs (228) the action and when it is done, will update the status to complete, which will then go all the way back to the monitoring system 102 via substrate metadata system 108. In some embodiments, all the while, target node 222 is pushing system health signals back up to monitoring system 102. In such embodiments, this functions as a control loop by always keeping an eye on coordinated system health via monitoring signals. In some embodiments, once monitoring system 102 sees that the status of target node 222 is complete, it selects the next node in the coordinated system for processing.

In some embodiments, a simple system will include only one primary node, with other nodes being secondary. In such embodiments, the primary node will defer and let all other nodes in the action group be processed before being processed. In such embodiments, once all other nodes in the action group have been processed, monitoring system 102 will go back to the deferred node and override the deferral in order to force the action. In such embodiments, the disruptive transition occurs only once. In other embodiments, there may be more than one primary node, and thus multiple deferrals. In such embodiments, the deferred nodes are still processed last in order to minimize disruptions based on how many deferred nodes are in the action group.

Figure 3:
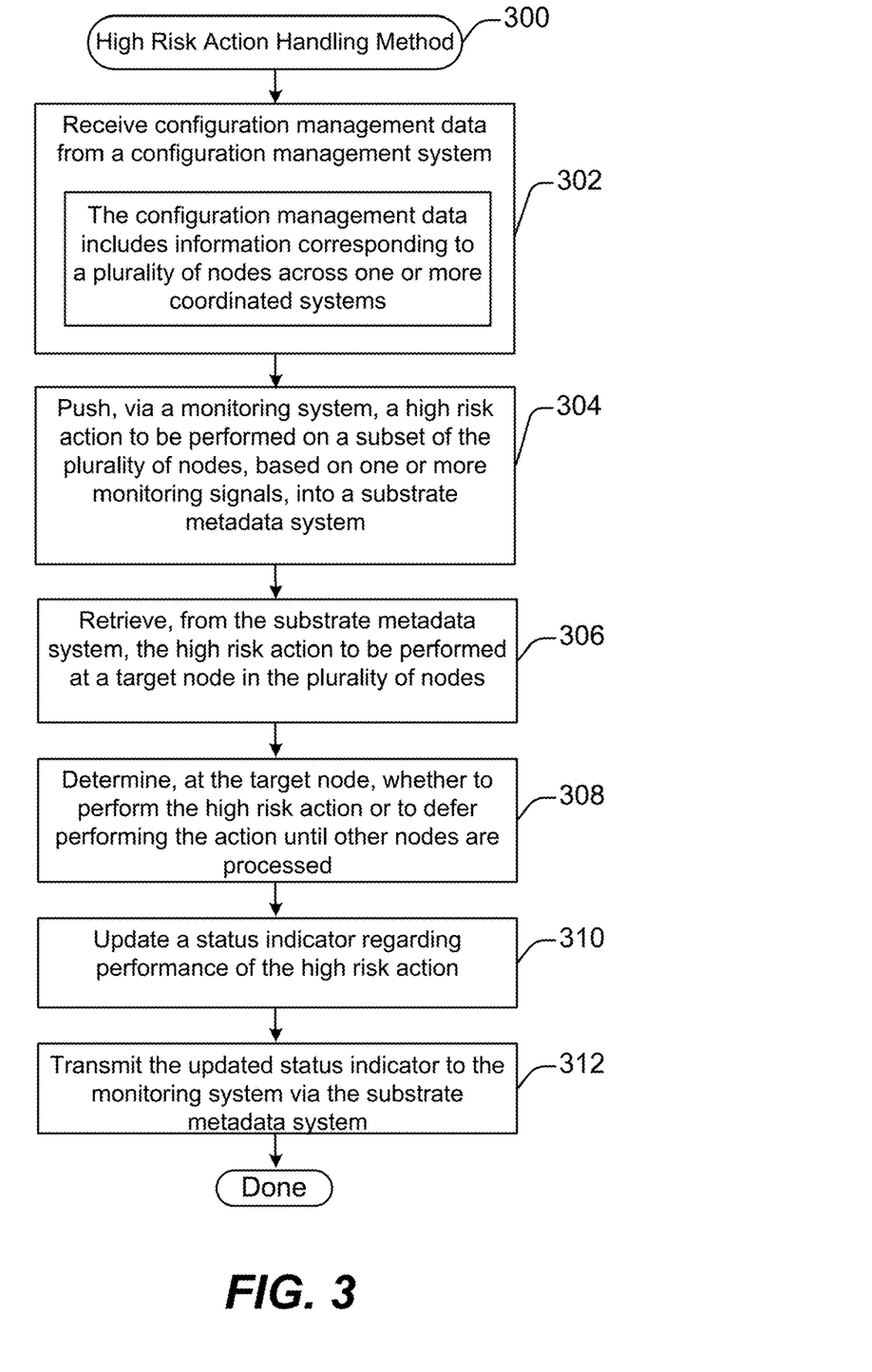
FIG. 3 illustrates an example of a method for handling de-centralized high risk actions across coordinated systems, in accordance with one or more embodiments.

FIG. 2 illustrates just one example of a workflow for handling high risk actions across different coordinated systems in a de-centralized manner. According to various embodiments, systems can use any subset or combination of the steps presented in FIG. 2 to handle high risk actions. FIG. 3 illustrates an example of a method for handling de-centralized high risk actions across coordinated systems, in accordance with one or more embodiments.

Method 300 begins with receiving (302) configuration management data from a configuration management system. In some embodiments, the configuration management data includes information corresponding to a plurality of nodes across one or more coordinated systems. At 304, a high risk action to be performed on a subset of the plurality of nodes is pushed, via a monitoring system, based on one or more monitoring signals, into a substrate metadata system. At 306, the high risk action to be performed at a target node in the plurality of nodes is retrieved from the substrate metadata system. At 308, the target node determines whether to perform the high risk action or to defer performing the action until other nodes are processed. At 310, a status indicator regarding performance of the high risk action is updated. Finally, at 312, the updated status indicator is transmitted to the monitoring system via the substrate metadata system In some embodiments, the one or more monitoring signals indicate the health of a coordinated system in the one or more coordinated systems. In some embodiments, the substrate metadata system operates as a two-way message broker between the monitoring system and the one or more coordinated systems. In some embodiments, determining whether to perform the high risk action or to defer performing the action until other nodes are processed occurs without input from a centralized point solution. In some embodiments, the monitoring system does not have access credentials into the one or more coordinated systems. In some embodiments, the monitoring system is agnostic to different types of coordinated systems. In some embodiments, the monitoring system utilizes the configuration management data to organize the plurality of nodes into action groups for pushing the high risk action.

According to various embodiments, the techniques and mechanisms of the present disclosure provide the ability to execute high-risk actions using de-centralized and isolated components. In some embodiments, the components include a monitoring system that acts as a high-risk activity advisor, a two-way messaging component, and a plurality of disparate coordinated computer systems. In some embodiments, the isolated components operate independently and without domain-specific authentication and authorization controls. In some embodiments, the two-way messaging component allows the advisor to send actions to the coordinated systems and for those systems to push updates about their status back to the advisor so they can be tracked. In some embodiments, the various coordinated systems, in a de-centralized fashion, are able to independently perform the high-risk actions themselves, in a safe manner (such that end-user access and data integrity and availability are maintained), without direct supervision from the advisor. In some embodiments, the de-centralized nature of the solution means the coordinator/advisor does not need any access to the systems it operates on, providing stronger security and less configuration burden. In some embodiments, the de-centralized nature of the solution means the coordinator/advisor does not have to have any special technology, or vendor-specific knowledge of the coordinated systems it operates on. In some embodiments, the monitoring/advisor system uses health signals from the target coordinated system to determine if the desired actions can be taken and when to take them. In some embodiments, the monitoring/advisor system, based on hints provided by the configuration management system, is automatically aware of the failure domains (for example, geographically-isolated data centers) of the coordinated system and is able to operate in such a way to avoid executing the action on more than one failure domain at a time. In some embodiments, to reduce disruption in the overall coordinated system, the de-centralized nature of the solution allows for a hand-off where the target of the coordinated system can make decisions specific to its role, health, and variable state when the action is requested and has the ability to defer the action for later. In some embodiments, the coordinated system, having an internal view more nuanced than that of the monitoring/advisor system, is able to temporarily decline requests to perform the requested action to reduce impact to connected clients. In some embodiments, the actions performed on the coordinated system are re-entrant and idempotent, i.e., the process on many hundreds of nodes may take place over several days and is thus subject to a variety of failure modes. However, in such embodiments the process can be restarted at any time and is guaranteed to pick up where it left off. In addition, in such embodiments, if the action has already been executed but, in error, is requested again it will not be executed twice. In some embodiments, the process automatically interrupts itself on pre-configured time boundaries so that the stream of actions is automatically paused, e.g., until at the end of business to avoid after-hours interruptions, or is configured to only run on weekends when interruptions are less disruptive to business. In some embodiments, the techniques and mechanisms of the present disclosure do not require a need to fence or lock multiple conflicting processes on the stream of actions from running concurrently, since they natively cannot conflict. In current technology and prior art, two executions of an action could lead to disastrous consequences.

The techniques and mechanisms of the present disclosure provide several advantages over current technology and prior art. Existing solutions are opinionated and specific to particular products or technologies. For example, Oracle Enterprise Manager, provides a degree of actions on its coordinated system (the Oracle Database) but has no capabilities or functions outside this vendor-specific space. Existing systems also require specific network connections and authentication to the target systems whereas ours is entirely de-centralized and relies instead on native cloud identities and connections.

According to various embodiments, the de-centralized nature of the solution presented herein means the coordinator does not need any access to the systems it operates on, since monitoring data is available, thus providing stronger security and less configuration burden. Existing solutions require usernames, passwords, certificates, and network ports between the components to be open, increasing operational overhead and opening new attack surfaces. In some embodiments, improved security is provided in the solution provided herein by requiring access only to the existing cloud substrate, not from any centralized (thus desirable attack vector) access point.

Using only current technology, in an enterprise with multiple types of coordinated systems (for example both the Oracle Database and MongoDB), multiple vendor-specific solutions would be necessary to coordinate actions, thereby increasing costs and operational burden, training staff on each, and acquiring, implementing, configuring, and monitoring each solution individually. The techniques and mechanisms of the present disclosure provide for a one-size-fits-all solution.

The techniques and mechanisms of the present disclosure are not obvious because they are based on designing and planning around the concepts of: de-centralization and avoidance of tight coupling, thus pushing the opinionated parts out to the edge inside the coordinated systems. The techniques and mechanisms of the present disclosure also provide improved security through a lightly-authenticated and loosely-coupled two-way messaging layer. In addition, the techniques and mechanisms of the present disclosure provide improved health awareness by use of the monitoring system with a high degree of safety. In addition, the techniques and mechanisms of the present disclosure provide for extreme automation and predictability provided by the configuration management system.

According to various embodiments, the monitoring system uses health signals from the target coordinated system to determine if the desired actions can be taken and when to take them. This is unique in that existing systems are assumed to have a good idea of the health of their own context (in the Oracle Enterprise Manager example: the state of the Oracle Database itself), but have no data on other aspects of the system as a whole, e.g., the capacity of a filesystem on a remote node not managed by Oracle or not germane to its database but nonetheless significant. Existing solutions in this space do not have access to monitoring system health signals.

In some embodiments, the monitoring system, in addition to coordinated system health signals, incorporates operator-defined exceptions to health issues such that actions can be executed despite them. This allows a point-in-time flexibility over executing actions despite errant health signals once they are acknowledged as acceptable.

In some embodiments, in hard-failure cases the operation is stopped without interruption to clients of the coordinated system. In some embodiments, in soft-failure cases, the operation is paused to allow the coordinated system to self-heal, but such a state will eventually promote to a hard-failure case, if the coordinated system does not self-heal, to stop the operation. This is unique because existing systems cannot automatically detect and handle unforeseen signals on the whole of the coordinated system, nor are they equipped to wait for these signals to self-heal before proceeding with the actions on the next target.

According to various embodiments, the techniques and mechanisms of the present disclosure provides a framework to deliver actions to an arbitrary list of coordinated (and simpler uncoordinated) computer systems. In such embodiments, the components delivered to and executed as part of the solution within the coordinated computer system are pluggable as part of a generic framework and easily tuned to the use case of each specific coordinated system and its needs. In some embodiments, the configuration management system provides the coordinated system with the data it needs to coordinate nodes of the system, such as knowing what nodes comprise a database system. In some embodiments, the configuration management system provides the monitoring system with the population of nodes that comprise each coordinated computer system and what signals to pull from those nodes to ascertain the health of those systems as a distinct entity. In some embodiments, native authentication to the substrate is configured by the configuration management system and allows two-way communication between the monitoring system and the coordinated system. In some embodiments, the monitoring system requests the actions against each coordinated computer system in a consistent order each time the actions are executed such that the order of operations and their impact is more predictable.

Figure 4:
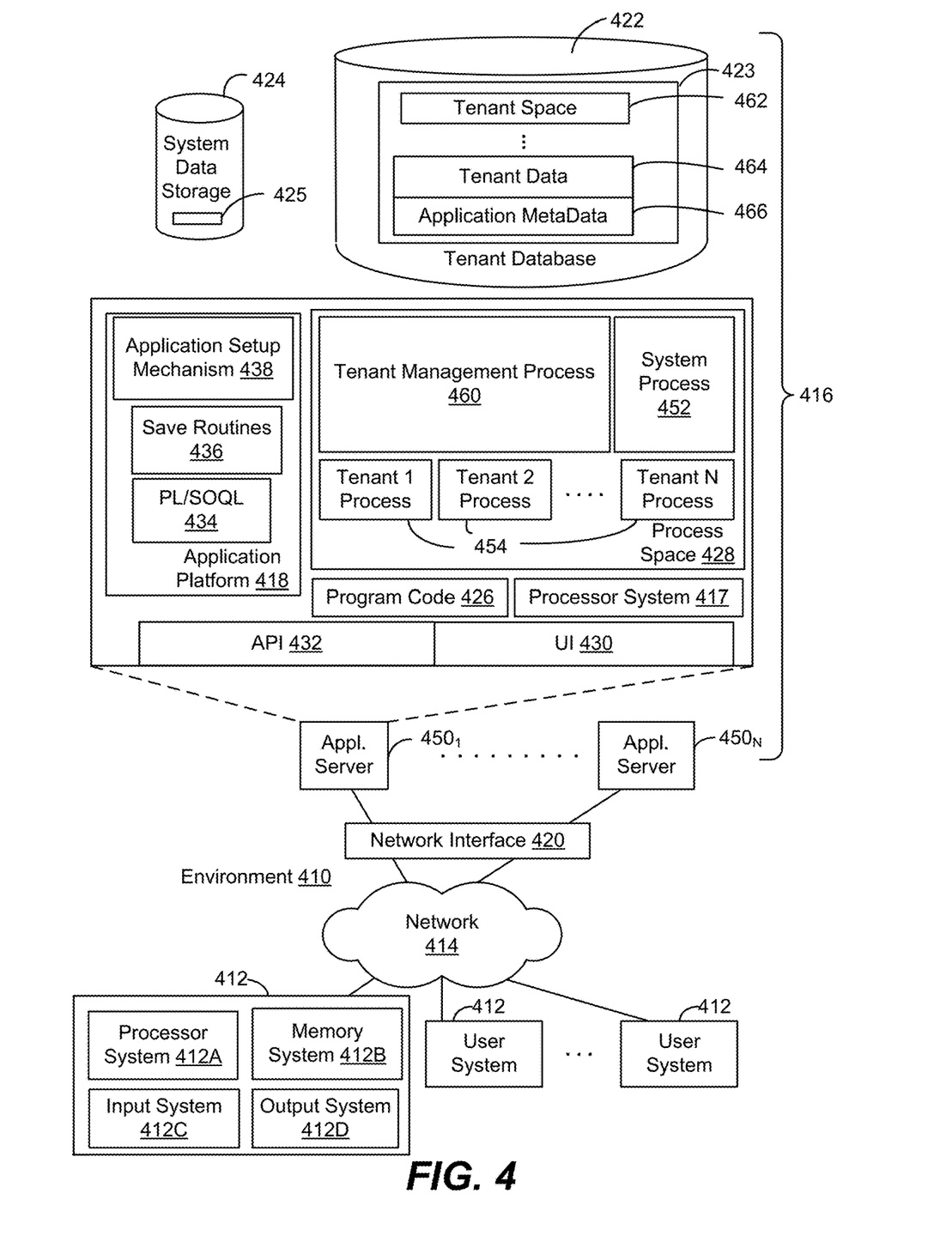
FIG. 4 shows a block diagram of an example of a database environment, configured in accordance with one or more embodiments.

FIG. 4 shows a block diagram of an example of an environment 410 that includes an on-demand database service configured in accordance with some implementations. Environment 410 may include user systems 412, network 414, database system 416, processor system 417, application platform 418, network interface 420, tenant data storage 422, tenant data 423, system data storage 424, system data 425, program code 426, process space 428, User Interface (UI) 430, Application Program Interface (API) 432, PL/SOQL 434, save routines 436, application setup mechanism 438, application servers 450-1 through 450-N, system process space 452, tenant process spaces 454, tenant management process space 460, tenant storage space 462, user storage 464, and application metadata 466. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 416, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 418 may be a framework that allows the creation, management, and execution of applications in system 416. Such applications may be developed by the database service provider or by users or third-party application developers accessing the service. Application platform 418 includes an application setup mechanism 438 that supports application developers' creation and management of applications, which may be saved as metadata into tenant data storage 422 by save routines 436 for execution by subscribers as one or more tenant process spaces 454 managed by tenant management process 460 for example. Invocations to such applications may be coded using PL/SOQL 434 that provides a programming language style interface extension to API 432. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 466 for a subscriber making such an invocation. Such system processes may also manage execution of application metadata 466 as an application in a virtual machine.

In some implementations, each application server 450 may handle requests for any user associated with any organization. A load balancing function (e.g., an F5 Big-IP load balancer) may distribute requests to the application servers 450 based on an algorithm such as least-connections, round robin, observed response time, etc. Each application server 450 may be configured to communicate with tenant data storage 422 and the tenant data 423 therein, and system data storage 424 and the system data 425 therein to serve requests of user systems 412. The tenant data 423 may be divided into individual tenant storage spaces 462, which can be either a physical arrangement and/or a logical arrangement of data. Within each tenant storage space 462, user storage 464 and application metadata 466 may be similarly allocated for each user. For example, a copy of a user's most recently used (MRU) items might be stored to user storage 464. Similarly, a copy of MRU items for an entire tenant organization may be stored to tenant storage space 462. A UI 430 provides a user interface and an API 432 provides an application programming interface to system 416 resident processes to users and/or developers at user systems 412.

System 416 may implement a web-based processing engine system. For example, in some implementations, system 416 may include application servers configured to implement and execute processing engine software applications. The application servers may be configured to provide related data, code, forms, web pages and other information to and from user systems 412. Additionally, the application servers may be configured to store information to, and retrieve information from, a database system. Such information may include related data, objects, and/or Webpage content. With a multi-tenant system, data for multiple tenants may be stored in the same physical database object in tenant data storage 422, however, tenant data may be arranged in the storage medium(s) of tenant data storage 422 so that data of one tenant is kept logically separate from that of other tenants. In such a scheme, one tenant may not access another tenant's data, unless such data is expressly shared.

Several elements in the system shown in FIG. 4 include conventional, well-known elements that are explained only briefly here. For example, user system 412 may include processor system 412A, memory system 412B, input system 412C, and output system 412D. A user system 412 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 412 to access, process and view information, pages and applications available from system 416 over network 414. Network 414 may be any network or combination of networks of devices that communicate with one another, such as any one or any combination of a LAN (local area network), WAN (wide area network), wireless network, or other appropriate configuration.

The users of user systems 412 may differ in their respective capacities, and the capacity of a particular user system 412 to access information may be determined at least in part by "permissions" of the particular user system 412. As discussed herein, permissions generally govern access to computing resources such as data objects, components, and other entities of a computing system, such as a processing engine, a social networking system, and/or a CRM database system. "Permission sets" generally refer to groups of permissions that may be assigned to users of such a computing environment. For instance, the assignments of users and permission sets may be stored in one or more databases of System 416. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 416 may provide on-demand database service to user systems 412 using an MTS arrangement. By way of example, one tenant organization may be a company that employs a sales force where each salesperson uses system 416 to manage their sales process. Thus, a user in such an organization may maintain contact data, leads data, customer follow-up data, performance data, goals and progress data, etc., all applicable to that user's personal sales process (e.g., in tenant data storage 422). In this arrangement, a user may manage his or her sales efforts and cycles from a variety of devices, since relevant data and applications to interact with (e.g., access, view, modify, report, transmit, calculate, etc.) such data may be maintained and accessed by any user system 412 having network access.

When implemented in an MTS arrangement, system 416 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 416 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 416 may also maintain system-level data usable by multiple tenants or other data. Such system-level data may include industry reports, news, postings, and the like that are sharable between tenant organizations.

In some implementations, user systems 412 may be client systems communicating with application servers 450 to request and update system-level and tenant-level data from system 416. By way of example, user systems 412 may send one or more queries requesting data of a database maintained in tenant data storage 422 and/or system data storage 424. An application server 450 of system 416 may automatically generate one or more SQL statements (e.g., one or more SQL queries) that are designed to access the requested data. System data storage 424 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale process, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 5A:
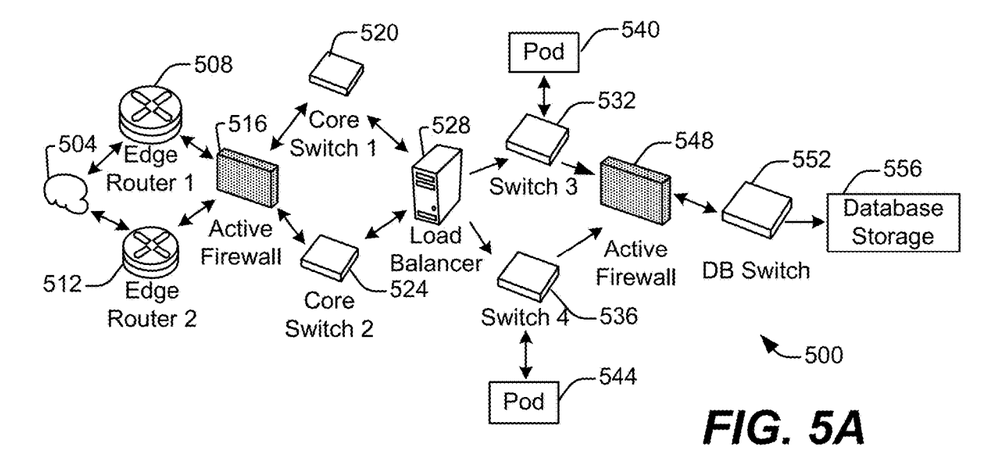
FIG. 5A shows a system diagram of an example of architectural components of an on-demand database service environment, in accordance with embodiments.

FIG. 5A shows a system diagram of an example of architectural components of an on-demand database service environment 500, configured in accordance with some implementations. A client machine located in the cloud 504 may communicate with the on-demand database service environment via one or more edge routers 508 and 512. A client machine may include any of the examples of user systems 412 described above. The edge routers 508 and 512 may communicate with one or more core switches 520 and 524 via firewall 516. The core switches may communicate with a load balancer 528, which may distribute server load over different pods, such as the pods 540 and 544 by communication via pod switches 532 and 536. The pods 540 and 544, which may each include one or more servers and/or other computing resources, may perform data processing and other operations used to provide on-demand services. Components of the environment may communicate with a database storage 556 via a database firewall 548 and a database switch 552.

Accessing an on-demand database service environment may involve communications transmitted among a variety of different components. The environment 500 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 5A and 5B.

The cloud 504 refers to any suitable data network or combination of data networks, which may include the Internet. Client machines located in the cloud 504 may communicate with the on-demand database service environment 500 to access services provided by the on-demand database service environment 500. By way of example, client machines may access the on-demand database service environment 500 to retrieve, store, edit, and/or process processing engine information.

In some implementations, the edge routers 508 and 512 route packets between the cloud 504 and other components of the on-demand database service environment 500. The edge routers 508 and 512 may employ the Border Gateway Protocol (BGP). The edge routers 508 and 512 may maintain a table of IP networks or 'prefixes', which designate network reachability among autonomous systems on the internet.

In one or more implementations, the firewall 516 may protect the inner components of the environment 500 from internet traffic. The firewall 516 may block, permit, or deny access to the inner components of the on-demand database service environment 500 based upon a set of rules and/or other criteria. The firewall 516 may act as one or more of a packet filter, an application gateway, a stateful filter, a proxy server, or any other type of firewall.

In some implementations, the core switches 520 and 524 may be high-capacity switches that transfer packets within the environment 500. The core switches 520 and 524 may be configured as network bridges that quickly route data between different components within the on-demand database service environment. The use of two or more core switches 520 and 524 may provide redundancy and/or reduced latency.

In some implementations, communication between the pods 540 and 544 may be conducted via the pod switches 532 and 536. The pod switches 532 and 536 may facilitate communication between the pods 540 and 544 and client machines, for example via core switches 520 and 524. Also or alternatively, the pod switches 532 and 536 may facilitate communication between the pods 540 and 544 and the database storage 556. The load balancer 528 may distribute workload between the pods, which may assist in improving the use of resources, increasing throughput, reducing response times, and/or reducing overhead. The load balancer 528 may include multilayer switches to analyze and forward traffic.

In some implementations, access to the database storage 556 may be guarded by a database firewall 548, which may act as a computer application firewall operating at the database application layer of a protocol stack. The database firewall 548 may protect the database storage 556 from application attacks such as structure query language (SQL) injection, database rootkits, and unauthorized information disclosure. The database firewall 548 may include a host using one or more forms of reverse proxy services to proxy traffic before passing it to a gateway router and/or may inspect the contents of database traffic and block certain content or database requests. The database firewall 548 may work on the SQL application level atop the TCP/IP stack, managing applications' connection to the database or SQL management interfaces as well as intercepting and enforcing packets traveling to or from a database network or application interface.

In some implementations, the database storage 556 may be an on-demand database system shared by many different organizations. The on-demand database service may employ a single-tenant approach, a multi-tenant approach, a virtualized approach, or any other type of database approach. Communication with the database storage 556 may be conducted via the database switch 552. The database storage 556 may include various software components for handling database queries. Accordingly, the database switch 552 may direct database queries transmitted by other components of the environment (e.g., the pods 540 and 544) to the correct components within the database storage 556.

Figure 5B:
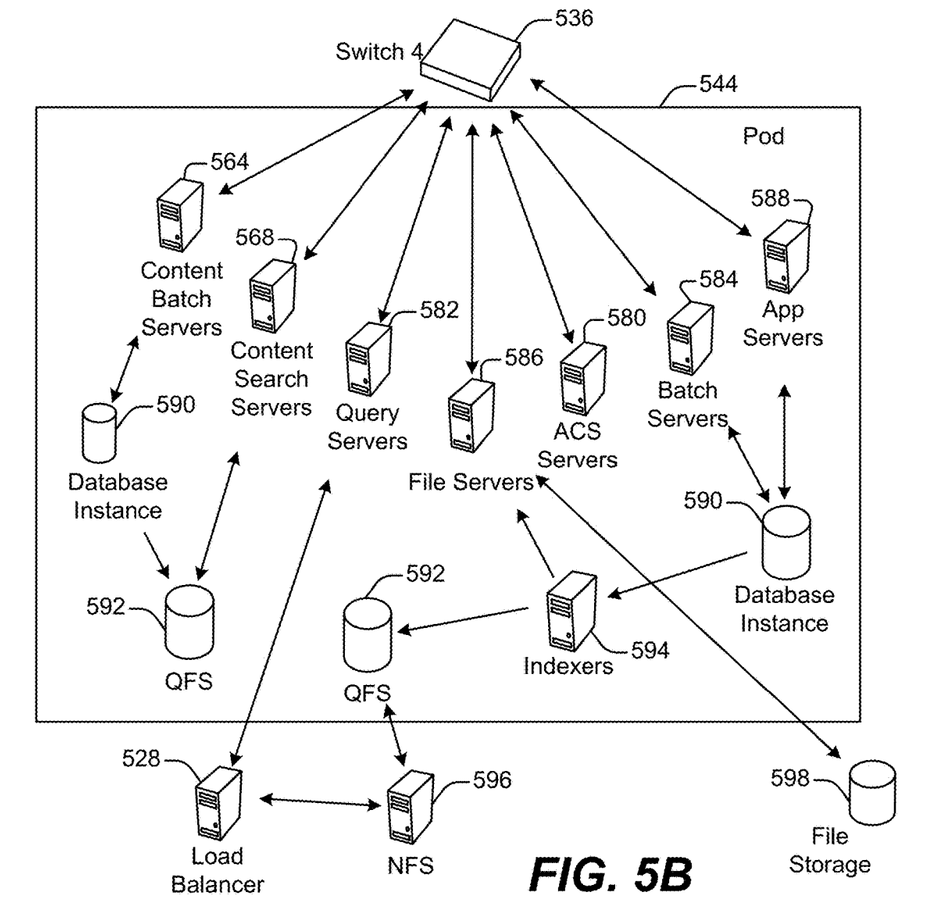
FIG. 5B shows a system diagram further illustrating an example of architectural components of an on-demand database service environment, in accordance with one or more embodiments.

FIG. 5B shows a system diagram further illustrating an example of architectural components of an on-demand database service environment, in accordance with some implementations. The pod 544 may be used to render services to user(s) of the on-demand database service environment 500. The pod 544 may include one or more content batch servers 564, content search servers 568, query servers 582, file servers 586, access control system (ACS) servers 580, batch servers 584, and app servers 588. Also, the pod 544 may include database instances 590, quick file systems (QFS) 592, and indexers 594. Some or all communication between the servers in the pod 544 may be transmitted via the switch 536.

In some implementations, the app servers 588 may include a framework dedicated to the execution of procedures (e.g., programs, routines, scripts) for supporting the construction of applications provided by the on-demand database service environment 500 via the pod 544. One or more instances of the app server 588 may be configured to execute all or a portion of the operations of the services described herein.

In some implementations, as discussed above, the pod 544 may include one or more database instances 590. A database instance 590 may be configured as an MTS in which different organizations share access to the same database, using the techniques described above. Database information may be transmitted to the indexer 594, which may provide an index of information available in the database 590 to file servers 586. The QFS 592 or other suitable filesystem may serve as a rapid-access file system for storing and accessing information available within the pod 544. The QFS 592 may support volume management capabilities, allowing many disks to be grouped together into a file system. The QFS 592 may communicate with the database instances 590, content search servers 568 and/or indexers 594 to identify, retrieve, move, and/or update data stored in the network file systems (NFS) 596 and/or other storage systems.

In some implementations, one or more query servers 582 may communicate with the NFS 596 to retrieve and/or update information stored outside of the pod 544. The NFS 596 may allow servers located in the pod 544 to access information over a network in a manner similar to how local storage is accessed. Queries from the query servers 522 may be transmitted to the NFS 596 via the load balancer 528, which may distribute resource requests over various resources available in the on-demand database service environment 500. The NFS 596 may also communicate with the QFS 592 to update the information stored on the NFS 596 and/or to provide information to the QFS 592 for use by servers located within the pod 544.

In some implementations, the content batch servers 564 may handle requests internal to the pod 544. These requests may be long-running and/or not tied to a particular customer, such as requests related to log mining, cleanup work, and maintenance tasks. The content search servers 568 may provide query and indexer functions such as functions allowing users to search through content stored in the on-demand database service environment 500. The file servers 586 may manage requests for information stored in the file storage 598, which may store information such as documents, images, basic large objects (BLOBs), etc. The query servers 582 may be used to retrieve information from one or more file systems. For example, the query system 582 may receive requests for information from the app servers 588 and then transmit information queries to the NFS 596 located outside the pod 544. The ACS servers 580 may control access to data, hardware resources, or software resources called upon to render services provided by the pod 544. The batch servers 584 may process batch jobs, which are used to run tasks at specified times. Thus, the batch servers 584 may transmit instructions to other servers, such as the app servers 588, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 6:
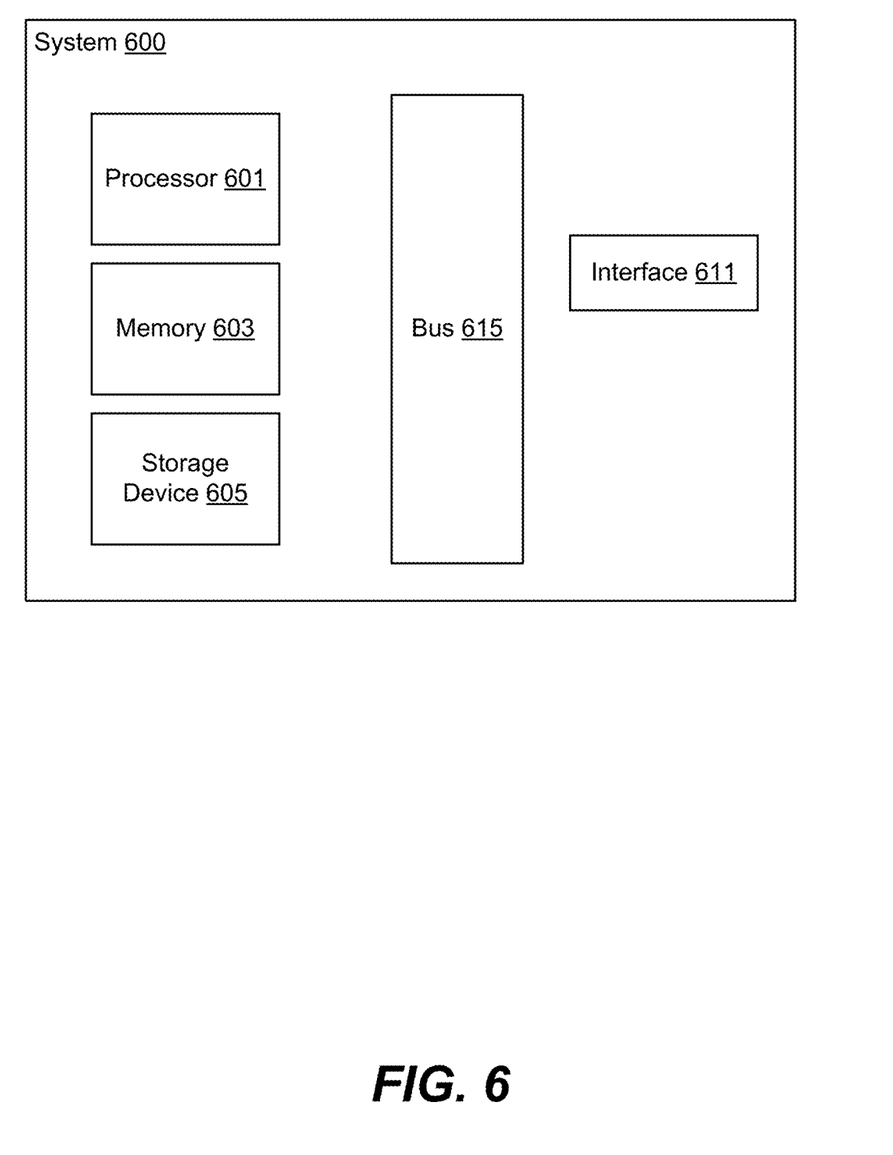
FIG. 6 illustrates one example of a computing device, configured in accordance with one or more embodiments.

FIG. 6 illustrates one example of a computing device. According to various embodiments, a system 600 suitable for implementing embodiments described herein includes a processor 601, a memory module 603, a storage device 605, an interface 611, and a bus 615 (e.g., a PCI bus or other interconnection fabric.) System 600 may operate as variety of devices such as an application server, a database server, or any other device or service described herein. Although a particular configuration is described, a variety of alternative configurations are possible. The processor 601 may perform operations such as those described herein. Instructions for performing such operations may be embodied in the memory 603, on one or more non-transitory computer readable media, or on some other storage device. Various specially configured devices can also be used in place of or in addition to the processor 601. The interface 611 may be configured to send and receive data packets over a network.

Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

What is claimed is:

1. A method, comprising:
    receiving configuration management data from a configuration management system, the configuration management data including information corresponding to a plurality of nodes across one or more coordinated systems;
    pushing, via a monitoring system, a high risk action to be performed on a subset of the plurality of nodes, based on one or more monitoring signals, into a substrate metadata system;
    retrieving, from the substrate metadata system, the high risk action to be performed at a target node in the plurality of nodes;
    determining by the target node without input from a centralized point solution, using health signals at the target node, whether to perform the high risk action or to defer performing the high risk action until other nodes are processed;
    updating a status indicator regarding performance of the high risk action; and
    transmitting the updated status indicator to the monitoring system via the substrate metadata system.

2. The method of claim 1, wherein the one or more monitoring signals indicate health of a coordinated system in the one or more coordinated systems.

3. The method of claim 1, wherein the substrate metadata system operates as a two-way message broker between the monitoring system and the one or more coordinated systems.

4. The method of claim 1, wherein the monitoring system does not have access credentials into the one or more coordinated systems.

5. The method of claim 1, wherein the monitoring system is agnostic to different types of coordinated systems.

6. The method of claim 1, wherein the monitoring system utilizes the configuration management data to organize the plurality of nodes into action groups for pushing the high risk action.

7. A database system implemented using a server system, the database system configurable to cause:
    receiving configuration management data from a configuration management system, the configuration management data including information corresponding to a plurality of nodes across one or more coordinated systems;
    pushing, via a monitoring system, a high risk action to be performed on a subset of the plurality of nodes, based on one or more monitoring signals, into a substrate metadata system;
    retrieving, from the substrate metadata system, the high risk action to be performed at a target node in the plurality of nodes;
    determining by the target node without input from a centralized point solution, using health signals at the target node, whether to perform the high risk action or to defer performing the high risk action until other nodes are processed;
    updating a status indicator regarding performance of the high risk action; and
    transmitting the updated status indicator to the monitoring system via the substrate metadata system.

8. The database system of claim 7, wherein the one or more monitoring signals indicate health of a coordinated system in the one or more coordinated systems.

9. The database system of claim 7, wherein the substrate metadata system operates as a two-way message broker between the monitoring system and the one or more coordinated systems.

10. The database system of claim 7, wherein the monitoring system does not have access credentials into the one or more coordinated systems.

11. The database system of claim 7, wherein the monitoring system is agnostic to different types of coordinated systems.

12. The database system of claim 7, wherein the monitoring system utilizes the configuration management data to organize the plurality of nodes into action groups for pushing the high risk action.

13. A computer program product comprising computer-readable program code capable of being executed by one or more processors when retrieved from a non-transitory computer-readable medium, the program code comprising instructions configurable to cause:
   receiving configuration management data from a configuration management system, the configuration management data including information corresponding to a plurality of nodes across one or more coordinated systems;
   pushing, via a monitoring system, a high risk action to be performed on a subset of the plurality of nodes, based on one or more monitoring signals, into a substrate metadata system;
   retrieving, from the substrate metadata system, the high risk action to be performed at a target node in the plurality of nodes;
   determining by the target node without input from a centralized point solution, using health signals at the target node, whether to perform the high risk action or to defer performing the high risk action until other nodes are processed;
   updating a status indicator regarding performance of the high risk action; and
   transmitting the updated status indicator to the monitoring system via the substrate metadata system.

14. The computer program product of claim 13, wherein the one or more monitoring signals indicate health of a coordinated system in the one or more coordinated systems.

15. The computer program product of claim 13, wherein the substrate metadata system operates as a two-way message broker between the monitoring system and the one or more coordinated systems.

16. The computer program product of claim 13, wherein the monitoring system does not have access credentials into the one or more coordinated systems.

17. The computer program product of claim 13, wherein the monitoring system is agnostic to different types of coordinated systems.

* * * * *